United States Patent [19]
Lovell

[11] Patent Number: 5,989,721
[45] Date of Patent: Nov. 23, 1999

[54] DEVICE AND METHOD FOR GENERATING ELECTRICAL ENERGY

[75] Inventor: Walter Carl Lovell, Wilbraham, Mass.

[73] Assignee: Tapeswitch Corporation of America, Farmingdale, N.Y.

[21] Appl. No.: 08/648,412

[22] Filed: May 15, 1996

[51] Int. Cl.⁶ .............................. B32B 15/04; B32B 15/08
[52] U.S. Cl. .................... 428/457; 428/461; 428/463; 428/623; 428/624; 428/626
[58] Field of Search ................................ 428/461, 463, 428/913, 650, 652, 674, 457, 623, 624, 626

[56] References Cited

U.S. PATENT DOCUMENTS

| | | | |
|---|---|---|---|
| 3,837,920 | 9/1974 | Liang et al. | 136/83 |
| 4,188,464 | 2/1980 | Adams et al. | 429/210 |
| 4,892,797 | 1/1990 | Rao et al. | 429/210 |
| 4,969,956 | 11/1990 | Kreider et al. | 136/201 |
| 5,057,161 | 10/1991 | Komabayashi et al. | 136/240 |
| 5,279,910 | 1/1994 | Sasaki et al. | 429/213 |
| 5,419,977 | 5/1995 | Weiss et al. | 429/7 |
| 5,421,909 | 6/1995 | Ishikawa et al. | 136/256 |

*Primary Examiner*—Paul Thibodeau
*Assistant Examiner*—Holly C. Rickman
*Attorney, Agent, or Firm*—Hoffmann & Baron, LLP

[57] ABSTRACT

A device for generating electrical current in the presence of ambient heat includes an intermediate layer having a predetermined electronegativity value interposed between a first outer layer and a second outer layer, in which the first outer layer has an electronegative value less than the intermediate layer, and the second outer layer has an electronegative value less than the first outer layer. The intermediate layer includes a first binder combination and a second binder combination. The first binder combination contains a polymeric binder and a first electronegative material. The second binder combination contains a polymeric binder and a second electrogneative material. The first and second binder combinations have a predetermined electronegative value that is greater than said first and second outer layers. A method of making and a method of activating the device for the generation of electricity are also disclosed.

17 Claims, 3 Drawing Sheets

FIG-1

Periodic table of electronegativity values:

| | | | | | | | | | | | | | | | | | |
|---|---|---|---|---|---|---|---|---|---|---|---|---|---|---|---|---|---|
| 1 H 2.1 | | | | | | | | | | | | | | | | | |
| 3 Li 1.0 | 4 Be 1.5 | | | | | | | | | | | 5 B 2.0 | 6 C 2.5 | 7 N 3.0 | 8 O 3.5 | 9 F 4.0 | |
| 11 Na 0.9 | 12 Mg 1.2 | | | | | | | | | | | 13 Al 1.5 | 14 Si 1.8 | 15 P 2.1 | 16 S 2.5 | 17 Cl 3.0 | |
| 19 K 0.8 | 20 Ca 1.0 | 21 Sc 1.3 | 22 Ti 1.5 | 23 V 1.6 | 24 Cr 1.6 | 25 Mn 1.5 | 26 Fe 1.8 | 27 Co 1.8 | 28 Ni 1.8 | 29 Cu 1.9 | 30 Zn 1.6 | 31 Ga 1.6 | 32 Ge 1.8 | 33 As 2.0 | 34 Se 2.4 | 35 Br 2.8 | |
| 37 Rb 0.8 | 38 Sr 1.0 | 39 Y 1.2 | 40 Zr 1.4 | 41 Nb 1.6 | 42 Mo 1.8 | 43 Tc 1.5 | 44 Ru 2.2 | 45 Rh 2.2 | 46 Pd 2.2 | 47 Ag 2.4 | 48 Cd 1.7 | 49 In 1.7 | 50 Sn 1.8 | 51 Sb 1.9 | 52 Te 2.1 | 53 I 2.5 | |
| 55 Cs 0.7 | 56 Ba 0.9 | 57 La 1.1 | 72 Hf 1.3 | 73 Ta 1.5 | 74 W 1.7 | 75 Re 1.9 | 76 Os 2.2 | 77 Ir 2.2 | 78 Pt 2.2 | 79 Au 2.4 | 80 Hg 1.9 | 81 Ti 1.8 | 82 Pb 1.8 | 83 Bi 1.9 | 84 Po 2.0 | 85 At 2.2 | |
| 87 Fr 0.7 | 88 Ra 0.9 | 89 Ac 1.1 | | | | | | | | | | | | | | | |

INCREASES ↑

DECREASES →

FIG-2

ELECTRONEGATIVE VALUES OF ELEMENTS FROM PERIODIC TABLE

| | | |
|---|---|---|
| 0.7 Cs | 1.6 Cr | 2.0 As |
| 0.7 Fr | 1.6 Ga | 2.0 B |
| 0.8 K | 1.6 Nb | 2.0 Po |
| 0.8 Ru | 1.6 V | 2.1 H |
| 0.9 Ba | 1.6 Zn | 2.1 P |
| 0.9 Na | 1.7 Cd | 2.1 Te |
| 0.9 Ra | 1.7 In | 2.2 At |
| 1.0 Ca | 1.7 W | 2.2 Ir |
| 1.0 Li | 1.8 Co | 2.2 Os |
| 1.0 Sr | 1.8 Fe | 2.2 Pd |
| 1.1 Ac | 1.8 Ge | 2.2 Pt |
| 1.1 La | 1.8 Mo | 2.2 Rh |
| 1.2 Mg | 1.8 Ni | 2.2 Ru |
| 1.2 Y | 1.8 Pb | 2.4 Ag |
| 1.3 Hf | 1.8 Si | 2.4 Au |
| 1.3 Sc | 1.8 Sn | 2.4 Se |
| 1.4 Zr | 1.8 Ti | 2.5 C |
| 1.5 Al | 1.9 Bi | 2.5 I |
| 1.5 Be | 1.9 Cu | 2.5 S |
| 1.5 Mn | 1.9 Hg | 2.8 Br |
| 1.5 Ta | 1.9 Re | 3.0 Cl |
| 1.5 Tc | 1.9 Sb | 3.0 N |
| 1.5 Ti | | 3.5 O |
| | | 4.0 F |

DEVICE AND METHOD FOR GENERATING ELECTRICAL ENERGY

BACKGROUND OF THE INVENTION

The present invention relates to devices that generate electrical current and, in particular, to a composite structure and methods of making and utilizing the composite structure to convert ambient heat to electrical current.

Over the years, many attempts have been made to harness energy from our environment in order to generate electricity. As a result, numerous electrochemical and thermoelectrical devices have been developed to convert solar energy to electricity. For example, attempts to convert solar energy to electricity have spawned some major technologies such as photovoltaic conversion devices. The heat content of solar radiation emitting electromagnetic radiation and particles is used to provide heat for generating electricity.

One attempt to achieve the conversion of solar energy to electricity is found in U.S. Pat. No. 5,421,909 issued to Ishikawa et al. which is directed to a photovoltaic device having a semiconductor layer, front and back electrodes, and a surface protection layer. The photovoltaic device of Ishikawa et al. converts electromagnetic radiation directly into electricity. Photovoltaic devices, however, require the use of semiconducting materials to absorb electromagnetic radiation. Semiconductor materials require a degree of care and technical expertise to produce and can be expensive.

Another method of generating electricity is through the use of an electrochemical system, such as the electrode process which is the principle process in electrochemical batteries. Important aspects of the electrode process include oxidation and reduction occurring as a result of electron transfer in coupled chemical reactions. Coupled reactions are initiated by production or depletion of the primary products which are reactants at the electrode surface. The chemical reaction utilized to produce electrical energy requires supplying electrons to an electrode forming a negative terminal and removing the electrons from the positive terminal. In a lead storage battery, for example, electrons are supplied to a negative terminal by the oxidation of metallic lead. At the positive terminal, lead is reduced. The electrons flowing in an external circuit from the negative to the positive terminal constitute the desired electric current. However, electrochemical systems utilize a redox reaction which ultimately deteriorates the source of chemical components in the systems.

Examples of efforts to generate electricity through the use of an electrochemical system such as electrode processes in batteries have been described in U.S. Pat. Nos. 3,837,920, 4,188,464, 4,892,797, 5,279,910, and 5,419,977. More specifically, U.S. Pat. No. 3,837,920 to Liang et al. is directed to a battery containing a solid electrolyte, an alkali metal anode, and a heavy metal cathode. The battery of the Liang et al. '920 references utilizes a redox reaction.

U.S. Pat. No. 4,188,464 to Adams et al. is directed to a composite electrode in bipolar electrolytic cells. The electrode includes an intermediate graphite layer interposed between two polymeric layers. Each side of the polymeric layers is in contact with an anode layer and a cathode layer. The electrode, however, functions as a battery and involves electrolysis.

U.S. Pat. No. 4,892,797 to Ran et al. involves a bipolar electrode for electrochemical cells and process for manufacturing the same. The bipolar electrode contains an electrically conductive intermediate layer interposed between an electronegative layer and an electropositive layer. The intermediate layer is a plastic substrate which includes electrically conductive particles. The electronegative layer can be silver coated nickel particles or aluminum. The electropositive layer can be a metal such as silver, copper, nickel, and lead. The bipolar electrode of the Ran et al. '797 reference, however, functions in electrochemical cells requiring a redox reaction.

U.S. Pat. No. 5,279,910 to Cysteic et al. is directed to an improved battery for reversible operation at ambient temperature. The battery includes a negative electrode, a composite positive electrode, an electrochemically active material, an electrolyte, and optionally an electron conductive material. The Cysteic et al. '977 battery requires a redox reaction.

U.S. Pat. No. 5,419,977 to Weiss et al. is directed to an electrochemical device for production of electrical energy. The electrochemical device involves operatively combined capacitors which can increase capacitance density and energy storage capability. The electrochemical device of the Weiss et al. '977 reference requires a redox reaction.

Another method for direct conversion of heat into electrical energy is via thermoelectrical devices based on the Seebeck effect, Peltier effect, and Thomson effect. The Seebeck effect concerns electromotive force (EMF) generated in a circuit composed of two different conductors whose junctions are maintained at two different temperatures (e.g., hot and cold junctions).

Peltier effect generates temperature differences from electrical energy. Peltier effect refers to the reversible heat generated at the junction between two different conductors when current passes through the junction. One of the conductors is connected to a cold junction and the other conductor is connected to a hot junction.

Thomson effect involves the reversible generation of heat in a single current-carrying conductor along which a temperature gradient is maintained. Thomson heat is proportional to the product of the current and the temperature gradient. Thomson heat is referred to as reversible in the sense that the conductor changes from a generator of Thomson heat to an absorber of Thomson heat when the direction of either the current of the temperature gradient is reversed.

Some examples of thermoelectrical devices are thermocouples (e.g., P-type thermoelectric conversion materials) and thermoelectric materials consisting of an oxide with perovskite structure. Thermoelectrical devices, however, are known to have disadvantages of relatively low efficiencies and high cost per unit of output. Examples of efforts to generate electricity via thermoelectrical devices are disclosed in U.S. Pat. Nos. 4,969,956 and 5,057,161. U.S. Pat. No. 4,969,956 to Kreider et al. is directed to a transparent thin film thermocouple and a method of manufacturing the same. The thermocouple of Kreider et al. includes a positive element of indium tin oxide and a negative element of indium oxide formed on a surface by reactive sputtering with the elements being electrically joined to form a hot junction for conversion of heat into electricity. The reactive sputtering is accomplished with a magnetron source in an argon and oxygen atmosphere.

U.S. Pat. No. 5,057,161 to Komabayashi et al. is directed to a p-type iron silicide thermoelectric conversion material. The thermoelectric conversion material patent involves Seebeck effect which requires two different temperatures.

Each of the technologies set forth above require conditions which, to a certain extent, constrain their use for a simple current-producing device which operates as a mere function of ambient temperature. It is therefore an object of the present invention to provide a composite structure and a method for generating electrical current which overcomes the disadvantages generally associated with the prior art.

SUMMARY OF THE INVENTION

The present invention is a device for generating electrical current in the presence of ambient heat. The preferred structure of the device is a multilayer laminate, and the invention also includes methods of making and activating the device.

The laminate in accordance with the present invention includes an intermediate layer having a predetermined electronegativity value interposed between a first outer layer and a second outer layer, in which the first outer layer has an electronegative value less than the intermediate layer, and the second outer layer has an electronegative value less than the first outer layer. Preferably, the intermediate layer is formed from a first and second binder combinations having an electronegative value from about 2.0 to about 4.0. Preferably, the first outer layer has an electronegative value from about 1.7 to about 1.9. Preferably, the second outer layer has an electronegative value from about 0.7 to about 1.6.

As described above, the intermediate layer preferably is formed from a first binder combination and a second binder combination. The first binder combination contains a polymeric binder and a first electronegative material. The second binder combination contains a polymeric binder and a second electronegative material. Preferably, the first and second binder combinations of the intermediate layer have a predetermined electronegative value that is greater than either the first or the second outer layer. The choice of the first and second electronegative materials result in a layer having an average electronegativity value greater than the first and second outer layers.

The polymeric binder is preferably polyvinyl acetate, polyvinyl chloride, or polyvinylidene fluoride. More preferably, the polymeric binder is polyvinyl acetate.

The first electronegative material of the intermediate layer is preferably As, B, Po, H, P, Te, At, Ir, Os, Pd, Pt, Rh, Ru, Ag, Au, Se, C, I, S, Br, Cl, N, O, F, or a mixture thereof. More preferably, the first electronegative material is phosphorous (P), and most preferably in the form of phosphorous red.

The second electronegative material of the intermediate layer is preferably Cr, As, B, Po, H, P, Te, At, Ir, Os, Pd, Pt, Rh, Ru, Ag, Au, Se, C, I, S, Br, Cl, N, O, F, or a mixture thereof. More preferably, the second electronegative material is chromium (Cr), and most preferably in the form of an oxide, e.g., $Cr_2O_3$.

The first outer layer is preferably Cd, In, W, Co, Fe, Ge, Mo, Ni, Pb, Si, Sn, Ti, Bi, Cu, Hg, Re, Sb, or a mixture thereof. More preferably, the first outer layer is Cu.

The second outer layer is preferably Cs, Fr, K, Ru, Ba, Na, Ra, Ca, Li, Sr, Ac, La, Mg, Y, Hf, Sc, Zr, Al, Be, Mn, Ta, Tc, Ti, Cr, Ga, Nb, V, Zn, or a mixture thereof. More preferably, the second outer layer is aluminum or aluminum magnesium.

The difference in the electronegativity between the intermediate layer and the first outer layer is from about 0.1 to about 3.3, preferably, from about 0.9 to about 1.16, and more preferably, 1.16.

The difference in the electronegativity between the first outer layer and the second outer layer is from about 0.1 to about 1.2, preferably, from about 0.3 to about 0.7, and more preferably, 0.7.

As a result of the present invention, a device, a method of making the device, and a method for generating electrical current in the presence of only ambient heat can be made. The device of the present invention can be simply and efficiently manufactured. The present invention does not require redox reaction of conventional batteries which result in deterioration of the source chemical components and corrosion of metal components.

For a better understanding the present invention, together with other and further objects, reference is made to the following description taken in conjunction with the examples, the scope of which is set forth in the appended claims.

BRIEF DESCRIPTION OF THE DRAWINGS

FIG. 1 is an annotated Periodic Table;

FIG. 2 contains a list of electronegative values of elements from the Periodic Table.

DETAILED DESCRIPTION OF THE INVENTION

Figure 3:
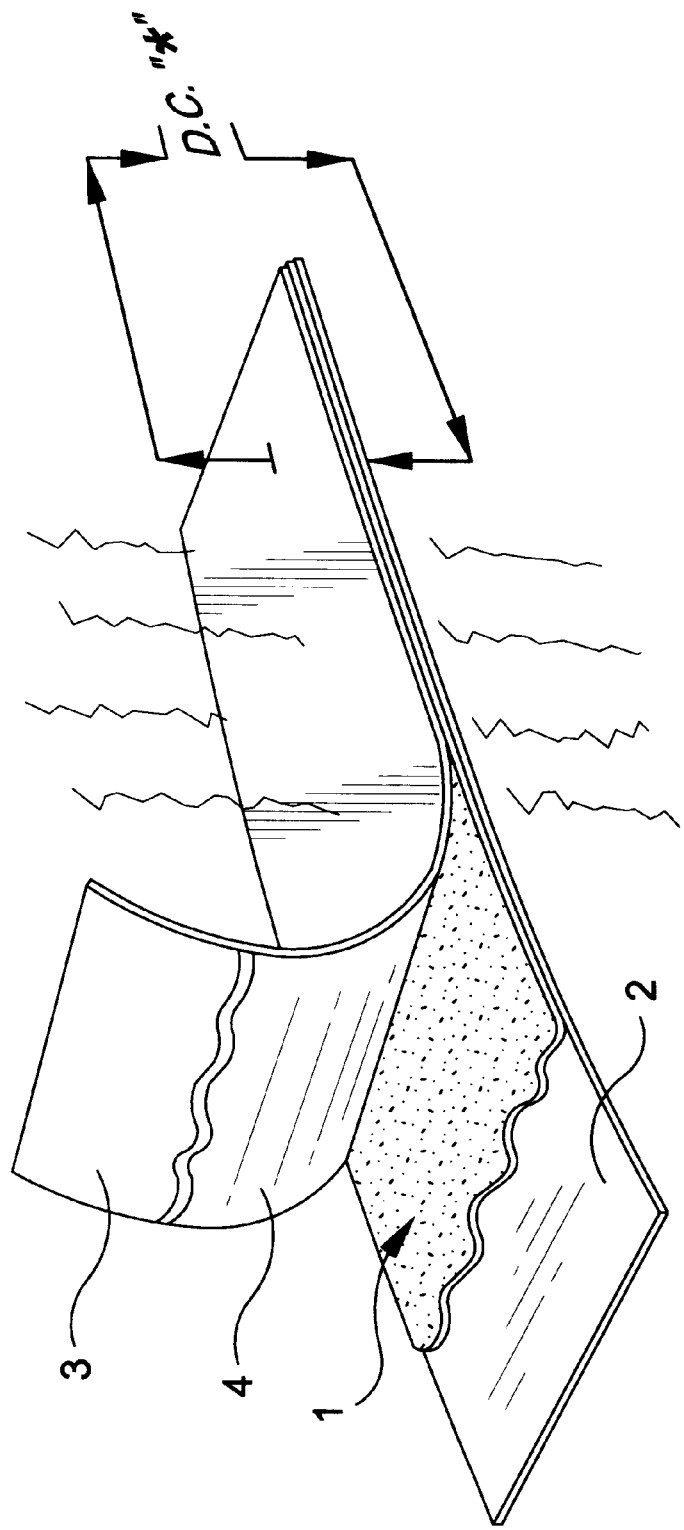
FIG. 3 is a perspective view of the laminate of the present invention.

The present invention is a device for generating electrical current in the presence of ambient heat. The device is preferably a multilayer structure which includes the use of an intermediate layer interposed between a first outer layer and a second outer layer. The present invention also includes methods of making and utilizing the device for generating electrical current in the presence of ambient heat.

The laminate in accordance with the present invention includes an intermediate layer having a predetermined electronegativity value interposed between a first outer layer and a second outer layer. The first outer layer has an electronegative value less than the intermediate layer, and in turn the second outer layer has an electronegative value less than the first outer layer.

Electronegativity is a relative measure of the ability of an atom in a molecule to attract electrons to itself. A scale of electronegativity values has been established by assigning a value to one element and then comparing other values of electronegativity to the assigned value.

The most widely used scale of electronegativity values was developed by Linus Pauling. (Leo J. Malone, *Basic Concepts of Chemistry*, 156–160 (2d ed. 1985). According to Linus Pauling, electronegativity is a periodic property that increases as one moves to the top and right of the Periodic Table. See FIG. 1.

On Pauling's scale, a value of 4.0 has been assigned to the highest electronegative element, i.e., fluorine. Other electronegativity values are then established relative to the value assigned to fluorine. See FIG. 2.

FIGS. 1 and 2 illustrate that the values of electronegativity of the representative elements tend to increase from left to right and from bottom to top of the Periodic Table. More specifically, electronegativity values tend to be low for the metallic elements in the lower left portion of the Periodic Table and are high for the nonmetals in the upper right portion of the Periodic Table. An exception to this trend is found in noble gases, which have electronegativity values approaching zero. Elements with low values of electronegativity have little attraction for electrons. They give up electrons easily.

The laminate in accordance with the present invention includes an intermediate layer having a predetermined electronegativity value interposed between a first outer layer and a second outer layer, in which the first outer layer has an electronegative value less than the intermediate layer, and the second outer layer has an electronegative value less than the first outer layer. Preferably, the intermediate layer comprises a first and second combinations having an electronegative value from about 2.0 to about 4.0. Preferably, the first outer layer has an electronegative value from about 1.7 to about 1.9. Preferably, the second outer layer has an electronegative value from about 0.7 to about 1.6.

In a preferred embodiment of the present invention, the intermediate layer is formed from a first binder combination and a second binder combination. The first binder combination includes a polymeric binder and a first electronegative material. The second binder combination includes a polymeric binder and a second electronegative material. The first and second binder of the intermediate layer combinations have a predetermined electronegative value that is greater than either the first or the second outer layer. The choice of the first and second electronegative materials result in a layer having an average electronegativity value greater than the first and second outer layers.

The polymeric binder is preferably polyvinyl acetate, polyvinyl chloride, or polyvinylidene fluoride. More preferably, the polymeric binder is polyvinyl acetate.

The first electronegative material of the intermediate layer is preferably As, B, Po, H, P, Te, At, Ir, Os, Pd, Pt, Rh, Ru, Ag, Au, Se, C, I, S, Br, Cl, N, O, F, or a mixture thereof. More preferably, the first electronegative material is phosphorous (P), and most preferably in the form of phosphorous red.

The second electronegative material of the intermediate layer is preferably Cr, As, B, Po, H, P, Te, At, Ir, Os, Pd, Pt, Rh, Ru, Ag, Au, Se, C, I, S, Br, Cl, N, O, F, or a mixture thereof. More preferably, the second electronegative material is chromium (Cr), and most preferably in the form of an oxide, e.g., $Cr_2O_3$.

In the present invention, the first and second electronegative materials are also heat sensitive materials. A heat sensitive material is a material which responds to a temperature above 32° F. by inducing electrons in a molecule to move. Preferably, the heat sensitive material responds to a temperature of 32° F. to 350° F.

The ratio of the polymeric binder to the first electronegative material of the first binder combination is from about 4:1 to 1:1, and preferably about 2:1.

The ratio of the polymeric binder to the second electronegative material of the second binder combination is from about 4:1 to 1:1, and preferably about 2:1.

The first outer layer is preferably Cd, In, W, Co, Fe, Ge, Mo, Ni, Pb, Si, Sn, Ti, Bi, Cu, Hg, Re, Sb, or a mixture thereof. More preferably, the first outer layer is Cu.

The second outer layer is preferably Cs, Fr, K, Ru, Ba, Na, Ra, Ca, Li, Sr, Ac, La, Mg, Y, Hf, Sc, Zr, Al, Be, Mn, Ta, Tc, Ti, Cr, Ga, Nb, V, Zn, or a mixture thereof. More preferably, the second outer layer is aluminum or aluminum magnesium.

In the present invention, the greater the differential value of the electronegativity of the intermediate, first outer, and second outer layers in the laminate, the greater the electrical current output.

The difference in the electronegativity between the intermediate layer and the first outer layer is from about 0.1 to about 3.3, preferably, from about 0.9 to about 1.16, and more preferably, 1.16.

The difference in the electronegativity between the first outer layer and the second outer layer is from about 0.4 to about 1.2, preferably, from about 0.3 to about 0.7, and more preferably, 0.7.

The laminate according to the present invention consists of a three-layer structure wherein the intermediate layer is laminated between the first outer layer and the second outer layer.

Preferably, the structure is prepared by (a) applying a first binder combination which contains a first electronegative material having a predetermined electronegativity value to a first outer layer, (b) applying a second binder combination which contains a second electronegative material having a predetermined electronegativity value to a second outer layer, and (c) compressing the first and second outer layers to form an intermediate layer from the first and second binder combinations. The first outer layer has an electronegativity value less than the first electronegative material of said first binder combination. The second outer layer has an electronegativity value less than the second electronegative material of the second binder combination. The second outer layer also has an electronegativity value less than the first electronegative material of the first outer layer. The intermediate layer has an electronegativity value greater than the first and second outer layers.

The method of the present invention also includes a method for generating electrical current by exposing a laminate set forth above to heat, e.g., a temperature of at least about 32° F. to 250° F. Unexpectedly, ambient heat is generally sufficient to generate electrical current.

In the presence of heat, the electrons in the laminate of the present invention flow in a circuit from high electronegativity to low electronegativity. It is believed this flow creates a void in the charge balance and therefore attracts the electrons to continuously flow in response to the ambient temperature. The flow of electrons increases in proportion with the increase of heat.

FIG. 3 illustrates the three layers of the laminate of the present invention and the flow of electrons in the laminate of the invention.

In the three layer embodiment depicted in FIG. 3, the laminate of the present invention is prepared by (a) applying a first binder combination of the intermediate layer 1 to the first outer layer 2, (b) applying a second binder combination of the intermediate layer 4 to the second outer layer 3, and (c) pressing the first and second outer layers 2 and 3 together to form the intermediate layer.

Examples have been set forth below for the purpose of illustration and to describe the best mode of the invention at the present time. The scope of the invention is not to be in any way limited by the Examples set forth herein.

EXAMPLES

The following examples are presented to demonstrate the efficacy of the present invention by comparing the invention to a control sample in which the electronegativity values of the layers in the laminate are the same.

Example 1

Control Sample

A three-layer laminate was prepared. A first outer layer of a 1.5 square inch copper foil was coated with polyvinyl acetate/phosphorus red in a 2:1 ratio. Another outer layer of a 1.5 square inch copper foil was coated with chromic oxide/polyvinyl acetate in a 1:2 ratio. The coated sides of the copper foils were pressed together to form an intermediate layer.

The difference in the electronegativity between the intermediate layer and the copper layers was 0.52. The electronegativity of each of the two outer layers were the same.

layer and the aluminum magnesium layer was 0.55. The difference in the electronegativity between the intermediate layer and the copper layer was 0.52.

The resulting three-layer laminate was placed under room temperature (70° F.), 100° F., and 212° F. Voltage and amperage of the laminate were measured and the results are illustrated in Table 1.

TABLE 1

|  | Control Sample | | | Laminate of the Present Invention | | | | | |
| --- | --- | --- | --- | --- | --- | --- | --- | --- | --- |
| EXAMPLES: | 1 | 1 | 1 | 2 | 2 | 2 | 3 | 3 | 3 |
| Temp. | 70° | 100° F. | 212° F. | 70° F. | 100° F. | 212° F. | 70° F. | 100° F. | 212° F. |
| Volts (v) | 0 | 0 | 0 | 0.25 | 0.50 | 0.75 | 0.75 | 1.00 | 1.20 |
| Amps. (mA) | 0 | 0 | 0 | 0.03 | 0.06 | 0.25 | 0.20 | 1.00 | 2.00 |

The resulting three-layer laminate was placed under room temperature (70° F.), 100° F., and 212° F. Voltage and amperage of the laminate were measured and the results are illustrated in Table 1.

The following examples are presented to demonstrate that electrical current is produced by the laminate of the present invention.

Example 2

LAMINATE OF THE PRESENT INVENTION

A three-layer laminate was prepared in the following manner. A first outer layer of a 1.5 square inch copper foil was coated with polyvinyl acetate/phosphorus red in a 2:1 ratio. Another outer layer of a 1.5 square inch aluminum was coated with chromic oxide/polyvinyl acetate in a 1:2 ratio. The coated side of the copper foil was pressed together against the coated side of the aluminum foil to form an intermediate layer.

The difference in the electronegativity between the intermediate layer and the aluminum layer was 0.32. The difference in the electronegativity of the copper outer layer and the aluminum layer was 0.40. The difference in the electronegativity between the intermediate layer and the copper layer was 0.52.

The resulting three-layer laminate was placed under room temperature (70° F.), 100° F., and 212° F. Voltage and amperage of the laminate were measured and the results are illustrated in Table 1.

Example 3

LAMINATE OF THE PRESENT INVENTION

A three-layer laminate was prepared. A first outer layer of a 1.5 square inch copper foil was coated with polyvinyl acetate/phosphorus red in a 2:1 ratio. Another outer layer of a 1.5 square inch aluminum magnesium was coated with chromic oxide/polyvinyl acetate in a 1:2 ratio. The coated side of the copper foil was pressed together against the coated side of the aluminum magnesium foil to form an intermediate layer.

The difference in the electronegativity between the intermediate layer and the aluminum magnesium layer was 1.02. The difference in the electronegativity of the copper outer The amount of electrical current of Examples 1, 2, and 3 were determined by measuring the voltage and the amperage of the electrical current.

From Table 1 it is readily apparent that the amount of electrical current produced was proportional to the difference in the electronegativity values between the layers of the laminate of Examples 1, 2, and 3. Control Example 1 demonstrated that when there was no difference in the electronegativity values between the outer layers, no electrical current was produced. In Example 2, where there was a difference in the electronegativity values of the three layers, an electrical current was produced. In Example 3, where there was a greater difference in the electronegativity values of the three layers, in comparison to Example 2, a greater electrical current was produced. Thus, the above examples illustrate that the greater the difference in the electronegativity values between the layers, a greater electrical current can be produced. Moreover, as will be apparent to one skilled in the art, increased temperatures of ambient heat resulted in an increased production of electrical current.

Thus, while there have been described what are presently believed to be the preferred embodiments, those skilled in the art will appreciate that other and further changes and modifications can be made without departing from the true spirit of the invention, and it is intended to include all such changes and modifications within the scope of the claims which are appended hereto.

We claim:

1. A multilayer laminate for generating electrical current in the presence of ambient heat comprising:

an intermediate layer having a predetermined electronegativity value interposed between a first outer layer and a second outer layer;

wherein said first outer layer has an electronegative value less than said intermediate layer;

wherein said second outer layer has an electronegative value less than said first outer layer; and wherein said intermediate layer comprising a first layer consisting of a first binder combination and a second layer consisting of a second binder combination, said first binder combination comprising a polymeric binder and a first electronegative material, said second binder combination comprising a polymeric binder and a second electronegative material which is different from said first electronegative material, and said first and second binder combinations each having a predetermined electronegative value that is greater than said first and second layers.

2. The laminate according to claim 1, wherein said polymeric binder is selected from the group consisting of polyvinyl chloride, polyvinyl fluoride and polyvinyl acetate.

3. The laminate according to claim 1, wherein said polymeric binder is polyvinyl acetate.

4. The laminate according to claim 1, wherein said first electronegative material of said intermediate layer is selected from the group consisting of Po, Te, Ir, Os, Pd, Pt, Rh, Ru, Ag, Au, and alloys O thereof.

5. The laminate according to claim 1, wherein said first electronegative material of said intermediate layer is phosphorus red.

6. The laminate according to claim 1, wherein said second electronegative material of said intermediate layer is selected from the group consisting of Cr, and alloys Po, Te, Ir, Os, Pd, Pt, Rh, Ru, Ag, Au, and alloys thereof.

7. The laminate according to claim 1, wherein said second electronegative material of said intermediate layer is $Cr_2O_3$.

8. The laminate according to claim 1, wherein said first outer layer is selected from the group consisting of Cd, In, W, Co, Fe, Ge, Mo, Ni, Pb, Si, Sn, Ti, Bi, Cu, Hg, Re, Sb, and mixtures thereof.

9. The laminate according to claim 1, wherein said first outer layer is Cu.

10. The laminate according to claim 1, wherein said second outer layer is selected from the group consisting of Cs, Fr, K, Ru, Ba, Na, Ra, Ca, Li, Sr, Ac, La, Mg, Y, Hf, Sc, Zr, Al, Be, Mn, Ta, Tc, Ti, Cr, Ga, Nb, V, Zn, and mixtures thereof.

11. The laminate according to claim 1, wherein second outer layer is selected from the group consisting of aluminum and aluminum magnesium.

12. The laminate according to claim 1, wherein the difference in electronegativity between the intermediate layer and the first outer layer is from about 0.40 to 3.30.

13. The laminate according to claim 1, wherein the difference in electronegativity between the first outer layer and the second outer layer is from about 0.10 to 1.20.

14. The laminate to according to claim 1, wherein said first electronegative material of said intermediate layer is selected from the group consisting of As, B, Po, P, Te, Ir, Os, Pd, Pt, Rh, Ru, Ag, Au, Se, C, S, oxygenated, hydrogenated, nitrogenated, and halogenated compounds thereof.

15. The laminate according to claim 1, wherein said second electronegative material of said intermediate layer is selected from the group consisting of Cr, As, B, Po, P, Te, Ir, Os, Pd, Pt, Rh, Ru, Ag, Au, Se, C, S, oxygenated, hydrogenated, nitrogenated, and halogenated compounds thereof.

16. The laminate according to claim 1, wherein said first outer layer is selected from the group consisting of Cd, In, W, Co. Fe, Ge, Ni, Pb, Si, Sn, Ti, Bi, Cu, Hg, Re, Sb, and compounds thereof.

17. The laminate according to claim 1, wherein said second outer layer is selected from the group consisting of Cs, Fr, K, Ru, Ba, Na, Ra, Ca, Li, Sr, Ac, La, Mg, Y, Hf, Sc, Zr, Al, Be, Mn, Ta, Tc, Ti, Cr, Ga, Nb, V, Zn, and compounds thereof.

* * * * *